(12) United States Patent
Baumgartner et al.

(10) Patent No.: US 7,624,297 B2
(45) Date of Patent: Nov. 24, 2009

(54) ARCHITECTURE FOR A PHYSICAL INTERFACE OF A HIGH SPEED FRONT SIDE BUS

(75) Inventors: Steven John Baumgartner, Zumbro Falls, MN (US); Anthony Richard Bonaccio, Shelburne, VT (US); Timothy Clyde Buchholtz, Rochester, MN (US); Daniel Mark Dreps, Georgetown, TX (US); Charles Porter Geer, Rochester, MN (US); Mounir Meghelli, Tarrytown, NY (US); Sergey Vladimirovich Rylov, Whtie Plains, NY (US); David W. Siljenberg, Byron, MN (US); Dana Marie Woeste, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 11/610,063

(22) Filed: Dec. 13, 2006

(65) Prior Publication Data

US 2008/0147952 A1 Jun. 19, 2008

(51) Int. Cl.
*G06F 1/10* (2006.01)
(52) U.S. Cl. .............. 713/501; 713/600; 710/305; 375/373
(58) Field of Classification Search ........... 713/501, 713/600; 710/305; 375/373
See application file for complete search history.

(56) References Cited

U.S. PATENT DOCUMENTS

| | | | | |
|---|---|---|---|---|
| 5,648,994 A * | 7/1997 | Kao | ............ | 375/376 |
| 5,970,110 A * | 10/1999 | Li | ............ | 377/48 |
| 6,014,047 A * | 1/2000 | Dreps et al. | ............ | 327/156 |
| 7,221,727 B2 * | 5/2007 | Co | ............ | 375/376 |
| 7,234,017 B2 * | 6/2007 | Biran et al. | ............ | 710/315 |

* cited by examiner

*Primary Examiner*—Thuan N Du
(74) *Attorney, Agent, or Firm*—Martin & Associates LLC; Bret J. Petersen

(57) ABSTRACT

A high speed computer processor system includes a high speed interface for a graphics processor. In a preferred embodiment, the high speed interface includes a front side bus (FSB) that interfaces to a similar high speed interface on the graphics processor.

17 Claims, 4 Drawing Sheets

US 7,624,297 B2

ARCHITECTURE FOR A PHYSICAL INTERFACE OF A HIGH SPEED FRONT SIDE BUS

BACKGROUND OF THE INVENTION

1. Technical Field

This invention generally relates to computer systems, and more specifically relates to an architecture for a physical interface of a high speed front side bus.

2. Background Art

Computer processors and computer systems are constantly evolving and improving. Ever faster computer processor systems are needed in the computer gaming industry to provide continued improvement in gaming performance.

The computer gaming industry has a need for a high speed processor with a high speed interface that can readily interface with a graphics processor. Without a higher speed interface connection the computer gaming industry will not be able to continue to offer continuing quality improvements to the computer gaming experience.

DISCLOSURE OF INVENTION

The present invention provides a high speed computer processor system with a high speed interface for a graphics processor. Embodiments are directed to a computer processor system for the computer gaming industry.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
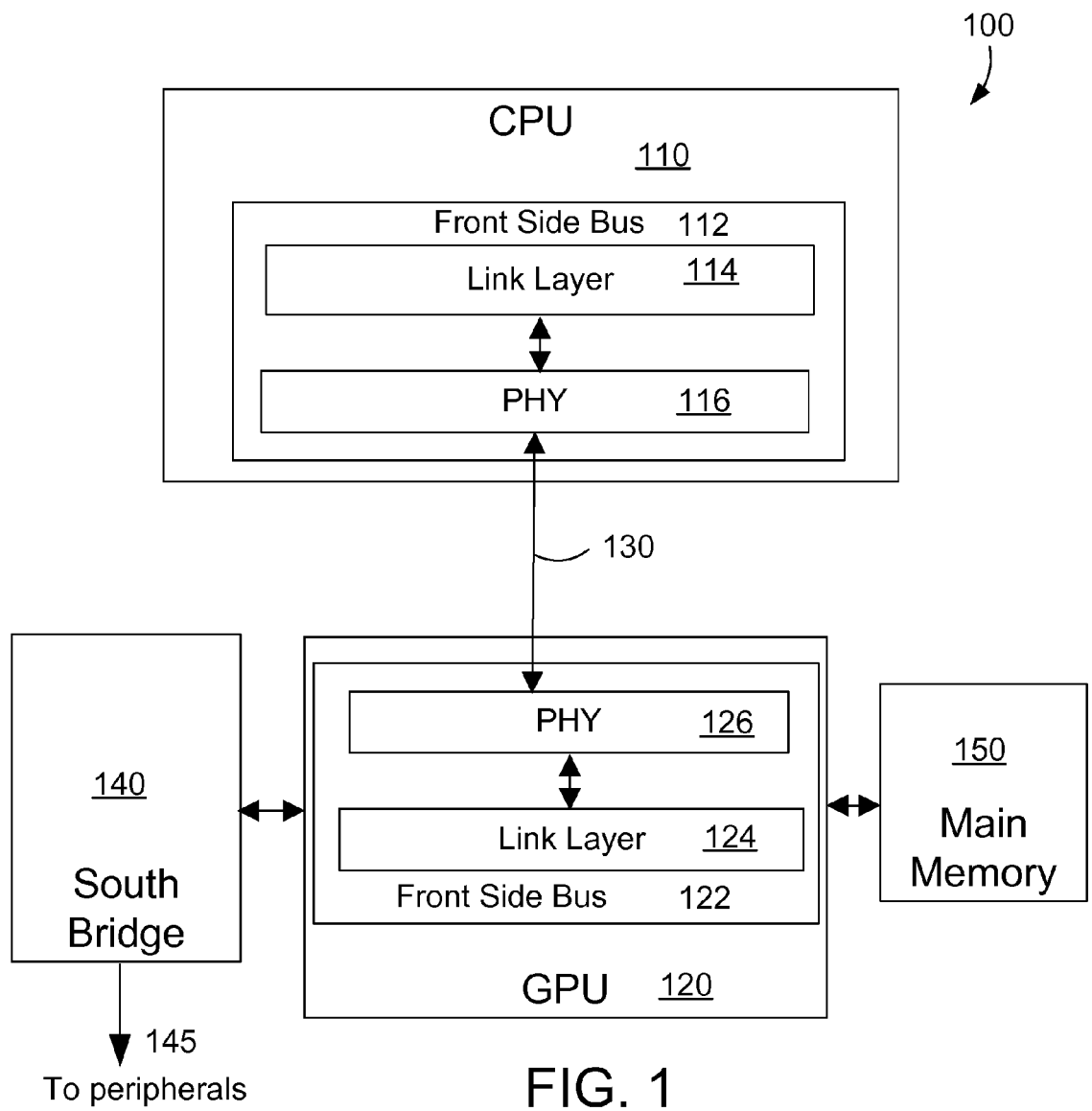
FIG. 1 is a block diagram of a computer system in accordance with the preferred embodiments.

FIG. 1 illustrates a block diagram of a computer system 100 according to a preferred embodiment. The computer system 100 includes a central processing unit (CPU) 110. The CPU 110 is connected to a graphics processor unit (GPU) 120 with a front side bus interconnect or channel 130. The illustrated embodiment shows a single CPU 110 but it is understood that multiple processors could be used. The GPU 120 is connected to a south bridge 140. The south bridge 140 has other connections 145 to various peripherals such as game controllers, and disk drives (not shown). The GPU 120 is also connected to main memory 150.

The CPU 110 includes a front side bus (FSB) 112 to interface to the FSB interconnect 130. The FSB 112 includes a link layer 114 that controls the protocol and link initialization. The link layer 114 connects to the physical layer (PHY) 116 that accepts the digital signals from the link layer 114 and drives the signals on the FSB channel 130 to the GPU 120. The GPU 120 also includes a front side bus (FSB) 122 to interface to the FSB channel 130. The FSB 122 includes a link layer 124 and a physical layer (PHY) 126 similar to those for the CPU.

Figure 2:
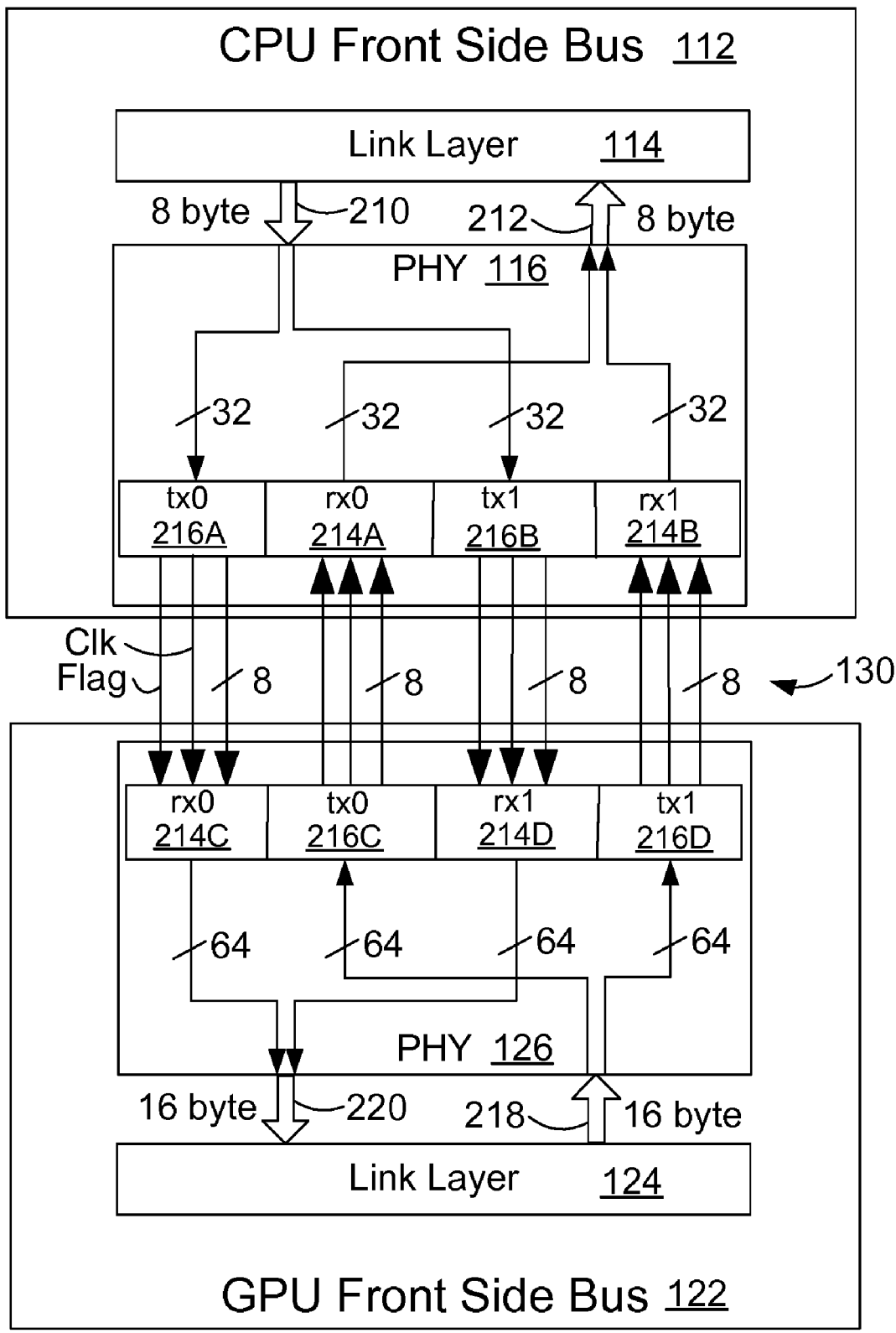
FIG. 2 is a block diagram that illustrates the FSB connections between the CPU and the GPU.

FIG. 2 illustrates a block diagram that provides more detail of the CPU FSB 112 and the GPU FSB 122 according to preferred embodiments. The link layer 114 in the CPU FSB 112 outputs an 8 byte parallel data stream 210 and inputs an 8 byte parallel data stream 212 from the PHY 116. These data streams 210, 212 preferably operate at 1.35 GHz. The 8 byte data stream 210 is divided into two 32 bit inputs that are connected to transmitter cores 216A and 216B. Similarly, the 8 byte data stream 212 is divided into two 32 bit outputs from the receiver cores 214A and 214B in the PHY 116 to the link layer 114. The receiver cores 214A, 214B and transmitter cores 216A, 216B are described further in the paragraphs below.

Again referring to FIG. 2, the GPU FSB 122 has a similar structure for communicating over the FSB interconnect 130. The link layer 124 in the GPU FSB 122 outputs a 16 byte parallel data stream 218 and inputs an 16 byte parallel data stream 220 from the PHY 126. These data streams 218, 220 preferably operate at 675 MHz. The 16 byte data stream 218 is divided into two 64 bit inputs that are connected to transmitter cores 216C and 216D. Similarly, the 16 byte data stream 220 is divided into two 64 bit outputs from the receiver cores 214C and 214D in the PHY 126 to the link layer 124. The transmitter cores 216A, 216B of the CPU front side bus 112 drive data across the FSB interconnect 130 to the receiver cores 214C, 214D of the GPU front side bus 122. Similarly, the receiver cores 214A, 214B of the CPU front side bus 112 receive data across the FSB interconnect 130 from the transmitter cores 216C, 216D of the GPU front side bus 122. Each receiver core 214 and transmitter core 216 receive or drive 10 signals over the FSB interconnect, respectively. There are 8 data signals, a flag, and clock for each receiver-transmitter pair. The GPU receiver cores 214C, 214D and transmitter cores 216C, 216D are similar to the receiver and transmitter cores in the CPU front side bus that are described below. However, the GPU receiver cores 214C, 214D and transmitter cores 216C, 216D are scaled twice the parallel width and operate at one half the frequency of the CPU cores described below.

Receiver Core

Figure 3:
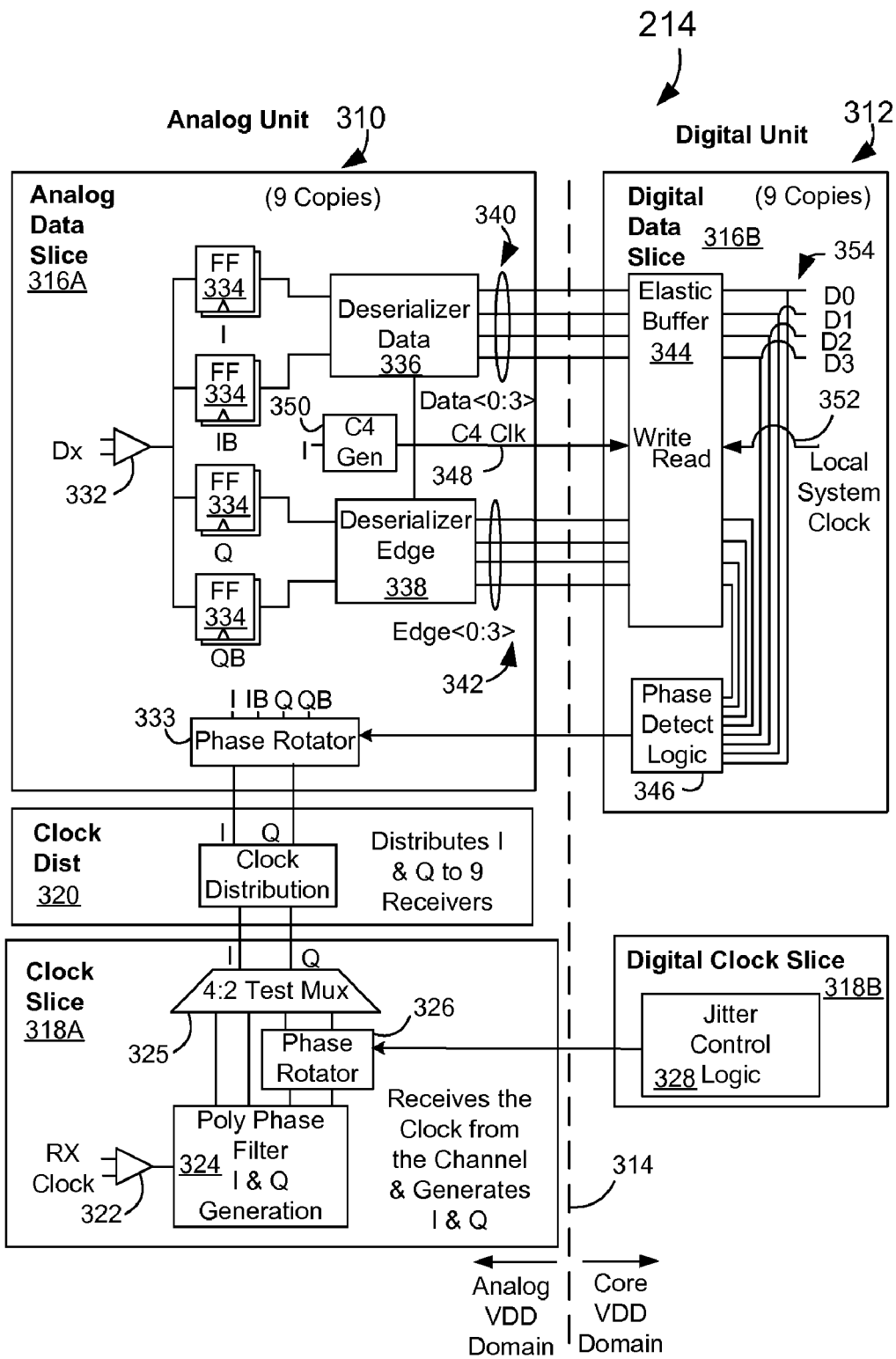
FIG. 3 is a block diagram of the receiver block shown in FIG. 2 in accordance with preferred embodiments.

A block diagram of the receiver core 214 is shown in FIG. 3. The receiver core 214 has an analog unit 310 and a digital unit 312. The analog unit 310 is in an analog VDD domain, and the digital unit 312 is in the CPU core VDD domain as represented by the vertical dotted line 314. The receiver has three major functional blocks; data slice 316A, 316B, clock slice 318A, 318B and clock distribution 320. The data slice block is divided into an analog portion 316A and a digital portion 316B. Similarly, the clock slice has an analog portion 318A and a digital portion 318B. The blocks of the receiver core 214 are described further in the paragraphs below.

Each receiver core 214 supports one byte of data and is referred to as a byte lane. In each byte lane, the data slice block 316A, 316B is instantiated 9 times, once for each of the 8 data bits and a ninth time for a flag signal. The flag is used by the FSB logic to delineate packets. The clock slice 318A, 318B and the clock distribution 320 are each only instantiated once for each receiver byte lane. The clock slice 318A contains the circuitry which receives the differential clock off the FSB channel 130 (FIG. 1) from the GPU.

The clock slice 318A has a preamplifier 322 that receives the clock signal (RX clock) from the channel. The preamplifier 322 has a fixed 1 dB amount of de-emphasis designed in.

This de-emphasis is implemented with a differential RC network (not shown) coupled between the sources of the receiving differential pair of NFET's. The overall and midband gain of the preamplifier 322 is 6 dB or better. The output of the preamplifier 322 is converted into 2 clock signals that are 90 degrees out of phase by the Poly Phase Filter block 324. The 2 clock signals are commonly referred to as I & Q clocks (In-phase and Quadrature). The I & Q clocks from poly phase filter 324 fan out to a test mux 325 and a phase rotator 326. In normal functional mode, the 4:2 test mux 325 will select the poly phase filter 324 outputs and pass them on to the clock distribution block 320. In a test mode the 4:2 Test Mux 325 outputs the I and Q clocks after passing through a phase rotator 326. The phase rotator 326 is controlled by the jitter control logic 328 that is part of the digital clock slice 318B. The jitter control logic 328 may include a digital state machine (not shown). The jitter control logic 328 can slowly and smoothly rotate the I & Q clocks through all of their possible phases for complete functional test coverage of the downstream deskew system. In addition to rotating slowly through all possible phases, the jitter control logic 328 can modulate the I & Q phases every system clock cycle to create a simulated high frequency jitter scenario for jitter tolerance characterization.

The clock distribution 320 is implemented with a low skew and low loss clock bus. The clock bus is tapped by all 9 copies of the data slices. The layout of the clock bus is preferably hand wired to control the characteristics of the wires and shields. The wiring of the clocks is important to minimize the skew between the I & Q clocks. Any skew between the I & Q clocks directly reduces the jitter tolerance of the data recovery system.

FIG. 3 further illustrates the data slice blocks 316A and 316B. There is one data slice block 316A, 316B for each of the 8 data bits and the one flag signal. They all operate independently because the possible skews between received data bits and the received clock are arbitrary and uncorrelated. The differential data 330 is received off the channel from the GPU. The differential data 330 is connected to a preamplifier 332 that has the same characteristics as the preamplifier described above for the clock slice 318A. The differential data 330 is amplified and distributed to 4 master slave flip-flops 334. Each of the flip-flops 334 are driven by one of the I, IB, Q or QB clocks from the phase rotator 333. The IB and QB clocks are the complements of the I and B clocks respectively. These flip-flops 334 are the primary sampling latches for the data recovery system. The output of the latches are deserialized by the 2:4 data deserializer 336 and the edge deserializer 338. The 4 bit nibbles produced by the I and IB clocks correspond to the data samples 340 and the 4 bit nibbles produced by the Q and QB clocks correspond to the edge samples 342. The data samples 340 and the edge samples are sent to the elastic buffer 344 described further below.

The phase detect logic 346 processes the results of the data samples 340 and edge samples 342 from the elastic buffer 344 and determines whether the I, IB, Q & QB clocks are sampling too early or too late. The phase detect logic 346 issues the appropriate code to the phase rotator 333 to correct the sampling phases towards a locked condition. The phase rotator inputs the I and Q clocks and produces I, IB, Q and QB clocks. The phase rotator 333 adjusts the phase of the I, 1B, Q & QB clocks corresponding to the code provided by the phase detector 346. When locked, the system will dither between least significant adjustments of the phase rotator 333 codes to equally balance the distribution of early and late corrections in the phase detector 346. This data recovery system has enough digital filtering in the feedback path to guarantee stable phase alignment under all data pattern and jitter conditions.

The Elastic Buffer 344 is preferably a CMOS circuit that is driven by 2 clocks that are the same frequency but have an arbitrary phase alignment. The data samples 340, 342 are written into a parallel buffer queue (not shown) on the edge of the write clock which has a known phase relationship to the data. In the illustrated embodiment, the write clock input of elastic buffer 344 is driven by a clock 348 having a frequency equal to one quarter of the bit rate that is produced by the C4 (quarter rate) clock generator 350 that inputs the I clock from the phase rotator 333. The read clock unloads the register in the middle of the buffer queue after a synchronization step has been invoked. The read clock input to the elastic buffer 344 is driven by a local system clock 352. The phase of the read clock and the C4 clock are allowed to wander apart in phase by ½ the width of the parallel buffer queue and under these conditions the read clock will still read valid data.

Transmitter Core

In general, each transmitter core 216 supports 8 data slices, 1 flag slice, and 1 clock slice. All the slices drive differential signals off chip to communicate over the channel 130 (FIG. 2). In addition, each TX core also provides 1.35 GHz and 2.7 GHz clock distribution, and clock generation. Each data and flag slice is responsible for serializing a four bit parallel data stream from the link layer and sending a serial bit stream across the channel, typically at a bit and baud rate of 5.4 gigabits per second (Gbps). The clock slice shares a common 2.7 GHz (Clk27) clock input with the data and flag slices, but does not have need for a capture signal or a FIFO. The data and flag bits are transmitted serially in a source synchronous manner, along with a 2.7 GHz clock emanating from the clock slice, at the maximum baud rate of 5.4 Gbps.

Figure 4:
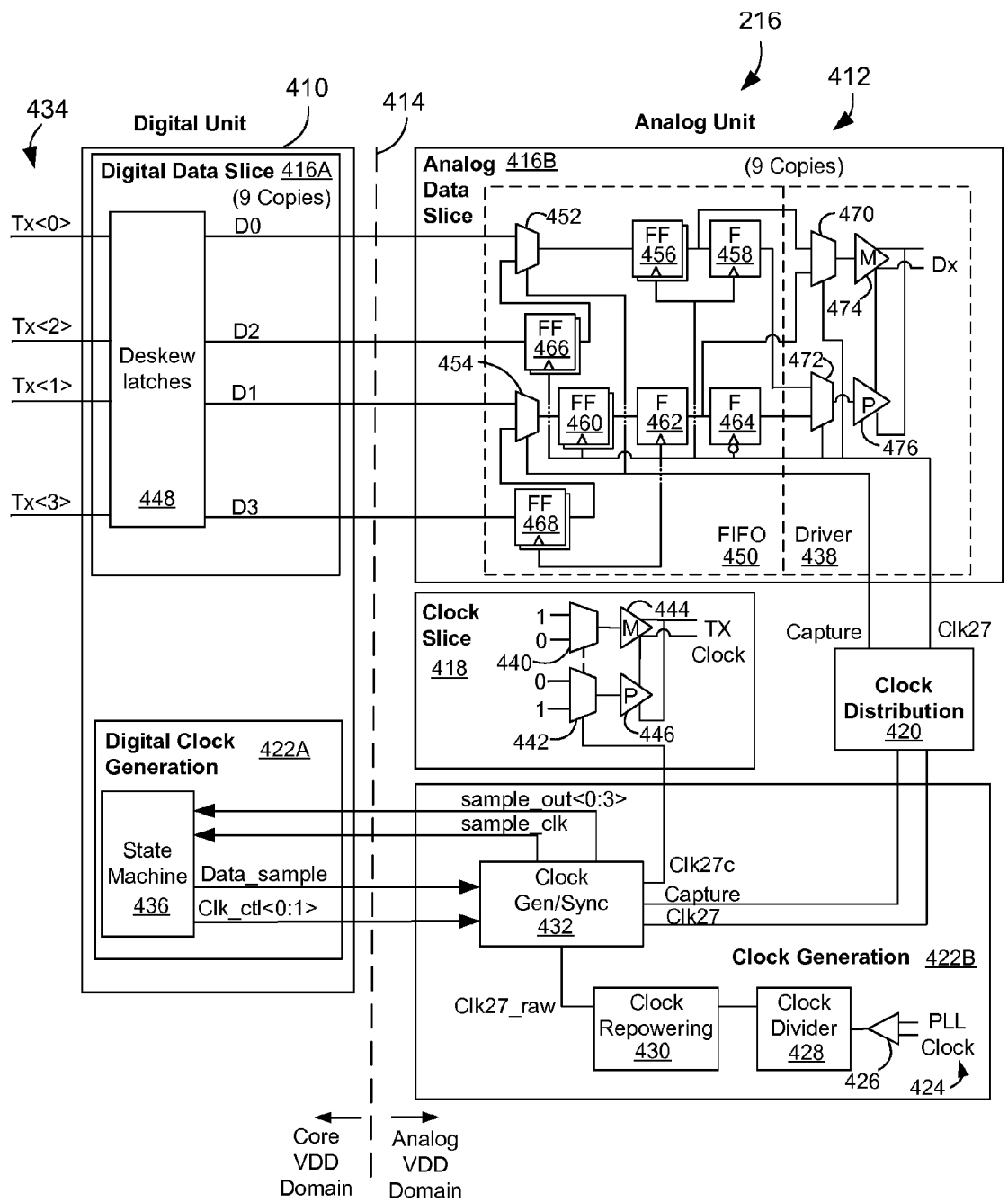
FIG. 4 is a block diagram of the transmitter block shown in FIG. 2 in accordance with preferred embodiments.

A block diagram of a transmitter core 216 is shown in FIG. 4. The transmitter core 216 has a digital unit 410 and an analog unit 412. The analog unit 412 is in an analog VDD domain, and the digital unit 410 is in the CPU core VDD domain as represented by the vertical dotted line 414. The transmitter has four major functional blocks, data slice 416A, 416B, clock slice 418, clock distribution 420, and clock generation 422A, 422B. The data slice block is divided into a digital portion 416A and an analog portion 416B. Similarly, the clock generation block is divided into a digital portion 422A and an analog portion 422B. The blocks of the transmitter core 216 are described further in the paragraphs below.

The clock generation block 422A, 422B allows the transmit core to deal with multiple clock frequencies and phase relationships. A high speed (full rate) clock 424 is received differentially from a phased locked loop (PLL) outside of the PHY to a buffer 426. This full rate clock typically runs at 5.4 GHz during functional applications. The clock generation block 422B includes a clock frequency divider 428 to create a synchronous half rate (nominally 2.7 GHz) clock from the full rate PLL clock received from the buffer 426 output. The divided clock passes through a repowering circuit 430 and then is supplied as Clk2_raw to the clock generator/synchronizer block 432 to synchronize the clocks for the transmit core. The synchronized clocks are used to serialize incoming data in the transmit FIFOs 450 and to then launch both outbound data and clock from the transmit driver ports as described further below. An alternative architecture for the above is a single clock repowering circuit 430, clock frequency divider 428, and buffer 426 to serve multiple transmit cores.

Transmit data 434 is input from the FSB link layer 114 (FIG. 1) and supplied to the digital data slice 416A. This data is referenced to a quarter rate local system clock 352 (FIG. 3) shared by the FSB logic. Though this local system clock 352 is derived from a common PLL there is an unknown and varying phase relationship between the local system clock and the full rate PLL clock 424. Since the transmit data 434 is sourced from the local system clock but serialized using the half rate (Clk27) and quarter rate (Capture) clocks from derived from the PLL clock 424, an asynchronous interface exists between the transmit data in the digital unit 410 and the analog unit 412. This asynchronous interface is overcome by the clock generator/synchronizer 432 in conjunction with a state machine 436 in the digital clock generation block 422A. The state machine 436 sends a frequency divided 675 MHz version of the system clock, referred to as the data_sample clock, to the clock generator/synchronizer 432 in the clock generation block 422B. Since this Data_sample clock and the transmit data 434 from the link layer data share the same timing relationship, the clock generator/synchronizer 432 can use the data sample clock as a reference signal to synchronize the clocks supplied to the data slice 416B to the transmit data 434 as described further below.

The clock generator/synchronizer 432 over samples the Data_sample clock with four quarter rate phases derived from Clk27_raw. In preferred embodiments, four oversampled data signals are retimed and then sent to the state machine 436 as sample_out<0:3> along with a sample_clk signal, which is one phase of the oversampling clocks. The state machine uses the sample_out signal and the sample_clk signal to output clock control signals (clk_ctl<0:1>). The clock control signals are sent to the clock generator/synchronizer to select which version of the quarter rate (Capture) and half rate (Clk27) clocks to use to control the transmitter. The state machine 436 determines which version to select by knowing the truth table that defines the relationship between Clk_ctl<0:1>, Capture, Clk27, and sample_clk then deciding which phase of Capture and Clk27 are most appropriate for sampling the Data_sample signal in the middle of its data valid window. Thus, the over sampled clock is used to create versions of the quarter rate and half rate clocks for transmit FIFO serialization that are synchronous to the local system clock allowing the transmit data from the link layer to be captured correctly. The clock generator/synchronizer 432 outputs Clk27c, Capture and Clk27 clock signals to the clock slice block 418 and clock distribution block 420 respectively. The Clk27 clock is a half rate (preferably 2.7 GHz) clock used by the FIFO 450 and the Driver 438 to serialize the transmit data 434. The Clk27c is a copy of the Clk27 signal used only by the Clock Slice, and the Capture clock is a quarter rate clock used by the FIFO to serialize the data nibble.

The clock slice block 418 receives input Clk27c and sends it out on the channel as transmitter clock (TX clock). The clock slice block conditions Clk27c to match the same timing characteristics as those of the driver for the data slice block 416B. This is done by putting Clk27c through a circuit with the same structure as the output driver 438 for the data slice block described below. Specifically, Clk27c is applied to the select inputs of two muxes 440, 442. The muxes 440, 442 have one input tied high (logical one) and the other tied low (logical zero). This makes the output of the muxes "ping-pong" between high and low. The output of the muxes are applied to a main (M) 444 and a pre-emphasis (P) 446 buffer in the same manner as described below for the data slice 416B driver circuit 438.

The clock distribution block 420 inputs the Capture clock and Clk27 from the clock generator/synchronizer block 432 and distributes these clocks to each of the 9 copies of the data slice block 416B. The clock distribution block 420 uses the same type of clock distribution circuit as used in the receiver clock distribution 320 (FIG. 3).

The digital data slice block 416A receives the transmitter data 434 from the CPU link layer 114 (FIG. 1). The digital data slice block 416A includes deskew latches 448 that retime the transmitter data 434 so the transmitter data 434 all arrives at the analog data slice 416B with low skew between bits.

The analog portion of the data slice block 416B contains a FIFO 450 and a driver 438. The FIFO 450 and driver 438 collectively perform the 4:1 serialization of the transmit data D0-D3 from the deskew latches 448. Inside of the FIFO 450, bit pairs D0/D2 and D1/D3 are captured into two-entry queues using 2:1 steering muxes 452, 454. The D0/D2 queue comprises a flip-flops 456 and a flop 458. The D1/D3 queue comprises a flip-flop 460 and two flops 462, 464. The synchronizing flip-flops 466, 468 latch D2 and D3 at the same time as D0 and D1 are being latched into the queues. D2 and D3 are latched into the queues on the next clock from the synchronizing flip-flops 466, 468. The steering muxes 452, 454 are clocked by the Capture clock (quarter rate clock). When the Capture clock is high, D0 and D1 are latched into their respective queue positions by Clk27 (half rate clock). When the quarter rate clocks are low D2 and D3 are latched into their respective queue positions by the half rate clock. These two-entry queues now represent two parallel data streams running at 2.7 Gbps. A final set of 2:1 steering muxes 470, 472 (one for each driver) inside of the driver 438 alternately selects data from each FIFO queue using the half rate clock. The data from the first steering mux 470 is applied to a main driver (M) 474 and the data from the second steering mux 472 is applied to the precompensation (P) driver 476. These drivers present transmitter data (Dx) at the driver ports on the channel (130 FIG. 2) at the baud rate of 5.4 Gbps. The main driver 474 provides an overshoot on the first bit of a datastream to compensate for inter-symbol interference while the precompensation driver 476 provides a de-emphasis on subsequent bits. The main driver 474 in the illustrated embodiment is built from seven 2 mA segments that are selectable by digital logic controls (not shown) depending on the drive levels required. Of course other multiples of segments could be used to scale the driver output.

The embodiments described herein provide improvements over the prior art. The preferred embodiments will provide the computer industry with a high speed interface for an overall increase in computer system performance, including minimized jitter, minimized latency and lower power compared to prior art designs.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer system comprising:
   a central processor unit (CPU) with a CPU front side bus (FSB) connected to a channel;
   a graphics processor unit (GPU) with a GPU FSB connected to the channel; and
   wherein the CPU FSB comprises a physical layer that receives a parallel data input from a plurality of receiver cores connected to the channel, and wherein the receiver cores comprise:

a clock slice block having an analog portion and a digital portion, wherein the analog portion includes a filter that generates an unrotated in-phase clock (I) and Quadrature clock (Q), a phase rotator for creating a rotated I and Q clocks that is controlled by jitter control logic, and a mux for selecting between the unrotated I and Q clocks and the rotated I and Q clocks to output unrotated or rotated I and Q clocks;

a plurality of data slice blocks having an analog portion and a digital portion; and a clock distribution block that distributes the selected rotated or unrotated I and Q clocks from the output of the mux to each copy of the data slice blocks.

2. The computer system of claim 1 wherein the plurality of data slice blocks of the receiver comprise:

a set of input latches in the analog portion that receive buffered data from the channel;

a phase rotator that receives the selected rotated or unrotated I and Q clocks from the mux and rotates them to supply an I, IB, Q and QB clocks to the input latches;

a data deserializer and an edge deserializer that input a serial data stream from the input latches and output parallel data; and an elastic buffer that accepts the parallel data from the deserializers and provides them to a link layer of the CPU FSB.

3. The computer system of claim 1 wherein the physical layer further comprises a plurality of transmitter cores that transmit data across the channel, and wherein the transmitter cores comprise:

a plurality of data slice blocks having a digital portion and an analog portion;

a clock slice block that outputs a compensated transmitter clock to the channel;

a clock generation block having an analog portion and a digital portion; and a clock distribution block that distributes clocks from the clock generation block to each copy of the data slice block.

4. The computer system of claim 3 wherein the plurality of data slice blocks in the transmitter core comprise:

deskew latches in the digital portion that receive digital data and latch it to reduce bit skew;

a FIFO that serializes the digital data from the deskew latches; and a driver that outputs serialized version of the digital data to the channel.

5. The computer system of claim 4 wherein the FIFO further comprises a plurality of steering muxes that steer data input bits from the deskew latches into a plurality of two entry queues and a second plurality of steering muxes in the driver that in combination with the FIFO perform serialization of the data input bits and sends serialized data onto the channel through a precompensated driver.

6. The computer system of claim 3 wherein the clock generation block further comprises:

a state machine in the digital portion of the clock generation block that provides a data sample and clock control signals to synchronize the clocks supplied to the data slice block; and wherein the clock generation block provides a sample clock and a plurality of sample out bits to the state machine and wherein the sample out bits are oversampled bits of the data sample clock.

7. A computer system comprising:

a central processor unit (CPU) with a CPU front side bus (FSB) connected to an channel;

a graphics processor unit (GPU) with a GPU FSB connected to the channel; and wherein the CPU FSB comprises a Physical layer that transmits data to the channel over a plurality of transmitter cores, and wherein the transmitter cores comprise:

a plurality of data slice blocks having a digital portion and an analog portion;

a clock slice block that outputs a compensated transmitter clock to the channel;

a clock generation block having an analog portion and a digital portion; and a clock distribution block that distributes clocks from the clock generation block to each copy of the data slice block.

8. The computer system of claim 7 wherein the plurality of data slice blocks in the transmitter core comprise:

deskew latches in the digital portion that receive digital data and latch it to reduce bit skew;

a FIFO that serializes the digital data from the deskew latches; and a driver that outputs serialized version of the digital data to the channel.

9. The computer system of claim 8 the FIFO further comprises a plurality of steering muxes that steer data input bits from the deskew latches into a plurality of two entry queues and a second plurality of steering muxes in the driver that in combination with the FIFO perform serialization of the data input bits and sends serialized data onto the channel through the driver, and wherein the driver is a precompensated driver.

10. The computer system of claim 7 wherein the clock generation block further comprises:

a state machine in the digital portion of the clock generation block that provides a data sample and clock control signals to synchronize the clocks supplied to the data slice block; and wherein the clock generation block provides a sample clock and a plurality of sample out bits to the state machine and wherein the sample out bits are oversampled bits of the data sample clock.

11. The computer system of claim 7 wherein the Physical layer further comprises a plurality of receiver cores that receive data from the channel, and wherein the receiver cores comprise:

a clock slice block having an analog portion and a digital portion, wherein the analog portion includes a filter that generates an unrotated in-phase clock (I) and Quadrature clock (Q), a phase rotator for creating a rotated I and Q clocks that is controlled by jitter control logic, and a mux for selecting between the unrotated I and Q clocks and the rotated I and Q clocks to output unrotated or rotated I and Q clocks;

a plurality of data slice blocks having an analog portion and a digital portion; and a clock distribution block that distributes the selected rotated or unrotated I and Q clocks from the output of the mux to each copy of the data slice blocks.

12. The computer system of claim 11 wherein the plurality of data slice blocks of the receiver comprise:

a set of input latches in the analog portion that receive buffered data from the channel;

a phase rotator that receives the I and Q clocks from the mux and rotates them to supply an I, IB, Q and QB clocks to the input latches;

a data deserializer and an edge deserailizer that input a serial data stream from the input latches and output parallel data;

an elastic buffer that accepts the parallel data from the deserializers and provides them to a link layer of the CPU FSB.

13. A computer game system comprising:

a central processor unit (CPU) with a CPU front side bus (FSB) connected to an channel;

a graphics processor unit (GPU) with a GPU FSB connected to the channel; and wherein the CPU FSB comprises a Physical layer that receives a parallel data input from a plurality of receiver cores connected to the channel and transmits data to the channel over a plurality of transmitter cores, wherein the receiver cores comprise:

a clock slice block having an analog portion and a digital portion, wherein the analog portion includes a filter that generates an unrotated in-phase clock (I) and Quadrature clock (Q), a phase rotator for creating a rotated I and Q clocks that is controlled by jitter control logic, and a mux for selecting between the unrotated I and Q clocks and the rotated I and Q clocks to output unrotated or rotated I and Q clocks;

a plurality of data slice blocks having an analog portion and a digital portion;

a clock distribution block that distributes the selected rotated or unrotated I and Q clocks from the output of the mux to each copy of the data slice blocks;

wherein the transmitter cores comprise:

a plurality of data slice blocks having a digital portion and an analog portion;

a clock slice block that outputs a compensated transmitter clock to the channel;

a clock generation block having an analog portion and a digital portion; and a clock distribution block that distributes clocks from the clock generation block to each copy of the data slice block.

14. The computer game system of claim 13 wherein the plurality of data slice blocks of the receiver comprise:

a set of input latches in the analog portion that receive buffered data from the channel;

a phase rotator that receives the I and Q clocks from the output of the 4:2 mux and rotates them to supply an I, IB, Q and QB clocks to the input latches;

a data deserializer and an edge deserailizer that input a serial data stream from the input latches and output parallel data;

an elastic buffer that accepts the parallel data from the deserializers and provides them to a link layer of the CPU FSB.

15. The computer game system of claim 13 wherein the plurality of data slice blocks in the transmitter core comprise:

deskew latches in the digital portion that receive digital data and latch it to reduce bit skew;

a FIFO that serializes the digital data from the deskew latches; and a driver that outputs serialized version of the digital data to the channel.

16. The computer game system of claim 15 wherein the FIFO further comprises a plurality of steering muxes that steer data input bits from the deskew latches into a plurality of two entry queues and a second plurality of steering muxes in the driver that in combination with the FIFO perform serialization of the data input bits and sends serialized data onto the channel through a precompensated driver.

17. The computer game system of claim 13 wherein the clock generation block of the transmitter further comprises:

a state machine in the digital portion of the clock generation block that provides a data sample and clock control signals to synchronize the clocks supplied to the data slice block; and wherein the clock generation block provides a sample clock and a plurality of sample out bits to the state machine and wherein the sample out bits are oversampled bits of the data sample clock.

* * * * *